United States Patent
Chen et al.

(10) Patent No.: US 6,184,835 B1
(45) Date of Patent: Feb. 6, 2001

(54) ELECTROMAGNETIC WAVE PREVENTING COVER OF A MOBILE PHONE HANDSET

(76) Inventors: Chien-Chuan Chen, No. 34, Hsin-Sheng 5th Road, Hu-Wei Town, Yunlin Country; Chun-Tien Chen, Section 1, Nei-Hu Road, Taipei, both of (TW)

(*) Notice: Under 35 U.S.C. 154(b), the term of this patent shall be extended for 0 days.

(21) Appl. No.: 09/478,971

(22) Filed: Jan. 6, 2000

(51) Int. Cl.$^7$ ............................................. H01Q 1/24
(52) U.S. Cl. ................................. 343/702; 343/895
(58) Field of Search ........................... 343/702, 895, 343/700 MS; 455/90, 271; 379/433; H01Q 1/24

(56) References Cited

U.S. PATENT DOCUMENTS

| | | | |
|---|---|---|---|
| 5,508,709 | * | 4/1996 | Krenz et al. ............ 343/702 |
| 5,513,383 | * | 4/1996 | Tsao ........................ 343/702 |
| 5,995,052 | * | 5/1999 | Sadler et al. ............ 343/702 |

* cited by examiner

Primary Examiner—Hoangann Le
(74) Attorney, Agent, or Firm—Pro-Techtor Inter-National Services

(57) ABSTRACT

A electromagnetic wave preventing cover of an mobile phone handset is covered to a casing of a handset and is connected to the antenna seat hole of the handset, so that the transmitting antenna of the mobile phone handset for emitting electromagnetic radiation is far away from the brain, and thus, the harm of the electromagnetic wave to the brain is reduced. A cover has a space for enclosing the mobile phone handset, and has a slot at the front surface of the cover for extending the communicating covering plate of the handset, and the cover has an opening for receiving the handset into the cover. A terminal serves to insert into the antenna seat hole of the mobile phone handset. An antenna is adhered to the outer surface of the communicating covering plate of the handset. A micro-wave shield coaxial cable is fixed within the cover and has an end connected to the terminal and another end connected to the planar antenna. Thus, the electromagnetic wave preventing cover of an mobile phone handset is covered to a casing of a handset and is connected to the antenna seat hole of the handset so that in communication. The receiving and transmitting source (i.e. antenna) is placed at the position far away from the user's brain and is below the outer side of the protecting cover. Therefore, the transmitting antenna of the mobile phone handset for emitting electromagnetic radiation is far away from the brain, and thus, the harms of the electromagnetic wave to the brain and hand are reduced.

6 Claims, 5 Drawing Sheets

ELECTROMAGNETIC WAVE PREVENTING COVER OF A MOBILE PHONE HANDSET

FIELD OF INVENTION

The present invention relates to an electromagnetic wave preventing cover of an mobile phone handset covered in a casing of a mobile phone handset and being connected to the antenna seat hole of the handset, so that the transmitting antenna of the mobile phone handset is far away from the brain in communication, and thus, the harms of the electromagnetic wave to the brain and hand is reduced.

BACKGROUND OF INVENTION

Nowadays, mobile phones become more and more popular, almost everyone has one handset. Mobile phones provide many convenience in the daily life. However, with the increase of mobile phone handset, interruption of the electromagnetic radiation to the human body become a serious problem. Especially, as a mobile phone is used, the handset is near the head of the user so that the brain is completely within the coverage of high frequency electromagnetic radiation.

The current used handsets have an average power range with 0.6~2 watts with a frequency band of 880~915 MHz, in a high frequency short band. The electromagnetic wave is emitted through a modulation of Gaussian Minimum Shift Keying (GMSK). In using, the mobile phone handset has an electromagnetic wave strength of 2~20 mG. Some disputations still exist about the harmful effect of the electromagnetic radiation from a handset to the human body. However, more and more research reports disclosed that some diseases about the brain are possibly related to the human brain. Since the action of electromagnetic wave will cause the pineal body in the brain to be concentrated and thus calcium will flow out to suppress the action of hormones so that the ability of immunity lose to induce cancer or other disease. Moreover, the weak vision, headache, and others will occur. Although the effect of the electromagnetic wave from a handset to the human body has not a determined conclusion, the mobile phone handsets are popular in the human world, and thus the interruption becomes more and more serious. Base in the consideration of safety, the experts suggest the user to use some protecting actions. For example, using a mobile phone handset with a lower electromagnetic radiation, leaving the head and hand far away from the radiating source (i.e. antenna), or preventing the brain to be exposed in the electromagnetic wave for a long time period.

However, in practical, many suggestions can not be achieved. For example, the current used handsets have an average power range with 0.6~2 watts. Therefore, the consumers can not select a handset with lower radiation. Moreover, if the emitting power of a handset is reduced, the quality of communication will be greatly effected. This is not suitable for the requirement of a communication device. Although the prior art protecting device is to add an radiating isolation material within the casing of a telephone for preventing the harmful effect of electromagnetic wave, since the most of the electromagnetic wave is radiated from the antenna of a handset, the isolation material within the case of a handset has no effect and is not practical.

In the aforesaid expert's suggestion, it is to leave from electromagnetic wave, since the power of electromagnetic wave is inversely proportional to the square of the distance, and so does the effect of the electromagnetic wave to the human body. For example, the accepted electromagnetic wave energy at a distance of one centimeter is 100 times of the electromagnetic wave energy at a distance of ten centimeters. Therefore, causing the electromagnetic radiating source (i.e. antenna) to be far away from the brain of the user is an effective way of preventing electromagnetic wave interruption to human body.

SUMMARY OF INVENTION

Accordingly, the primary object of the present invention is to provide an electromagnetic wave preventing cover of an mobile phone handset being connected to the antenna seat hole of the handset, so that in communication, the receiving and transmitting source (i.e. antenna) is placed at the position far away from the user's brain and is below the outer side of the protecting cover. Therefore, the transmitting antenna of the mobile phone handset for emitting electromagnetic radiation is far away from the brain, and thus, the harm of the electromagnetic wave to the brain is reduced. Moreover, as the handset is hung from the waist in a waiting condition, the receiving and transmitting source is exposed outside the waist to avoid that the waist and human organs are harmed by electromagnetic radiation.

Another object of the present invention is to provide a mobile phone handset electromagnetic wave preventing cover. When the electromagnetic wave preventing cover is disposed on the mobile phone handset, no matter in communication or standby condition, the receiving and transmitting source (i.e. antenna) is exposed at outer side of the user so as to avoid to interruption of the head and hands of users. Therefore, the emitting efficiency of electromagnetic wave signal is increased.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

DESCRIPTION OF PREFERRED EMBODIMENTS

Figure 1:
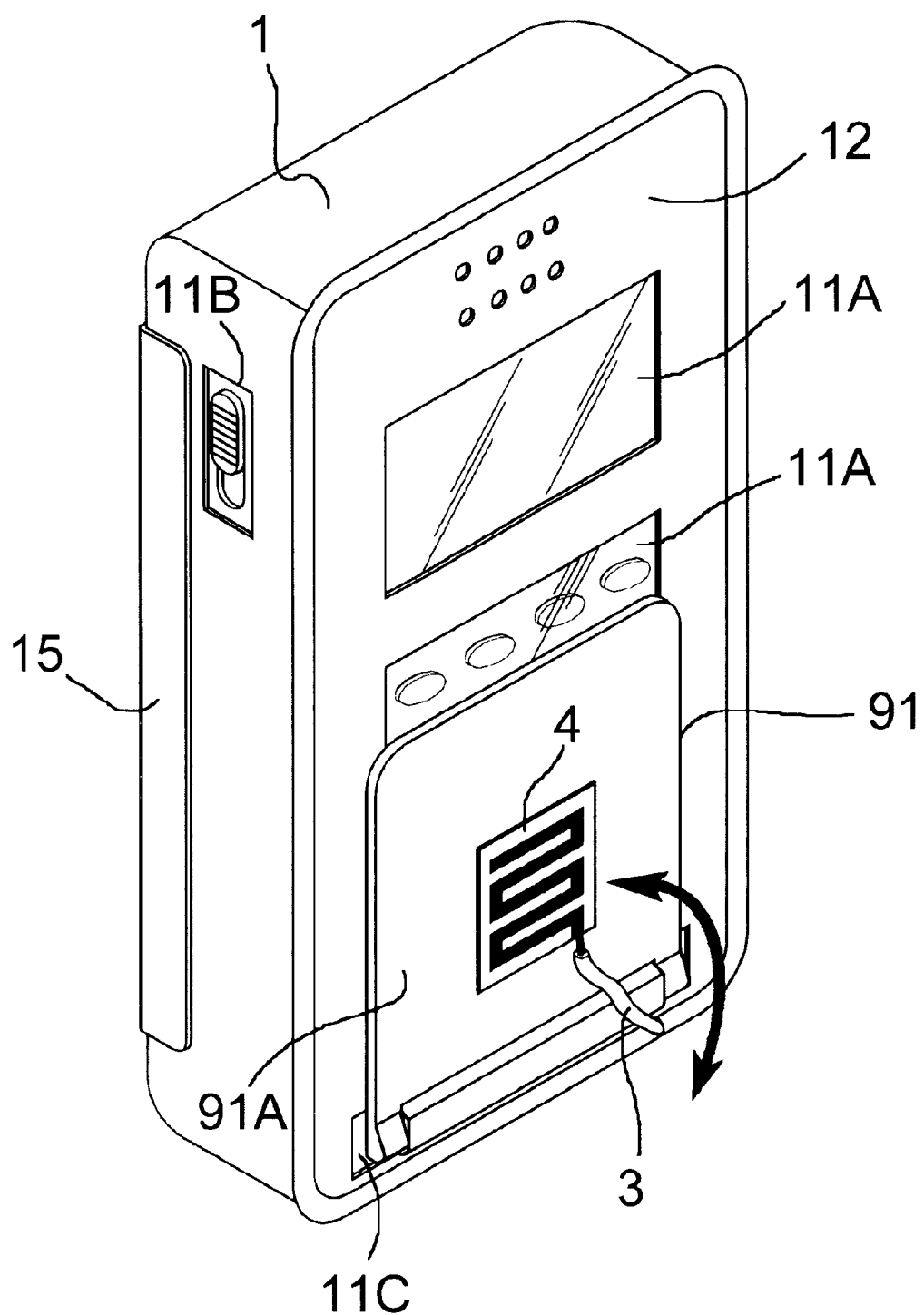
FIG. 1 is a front perspective view of the first embodiment according to the present invention showing the communicating covering plate being closed.
Figure 2:
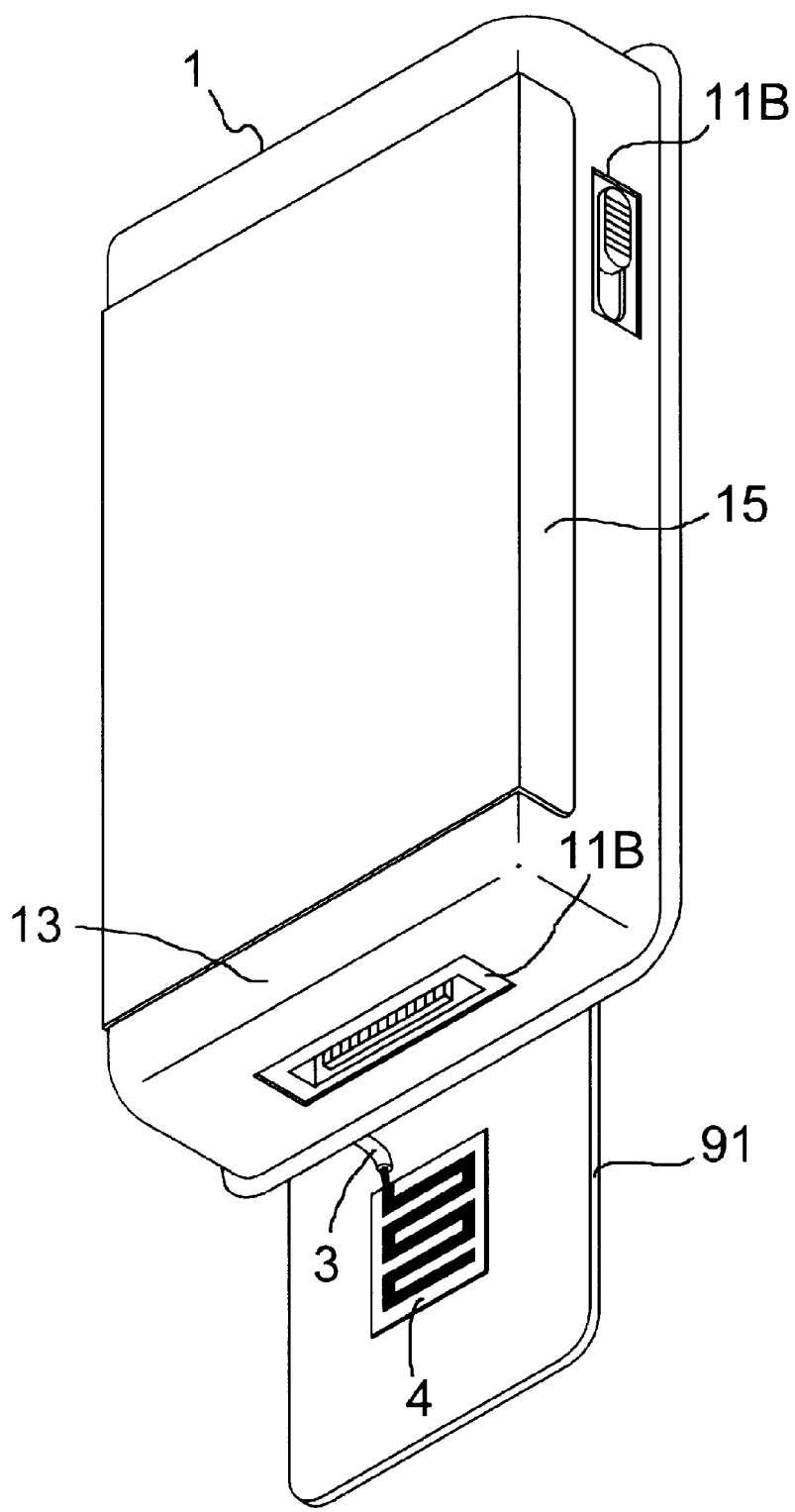
FIG. 2 is a rear perspective view of the first embodiment according to the present invention showing the communicating covering plate being opened.
Figure 3:
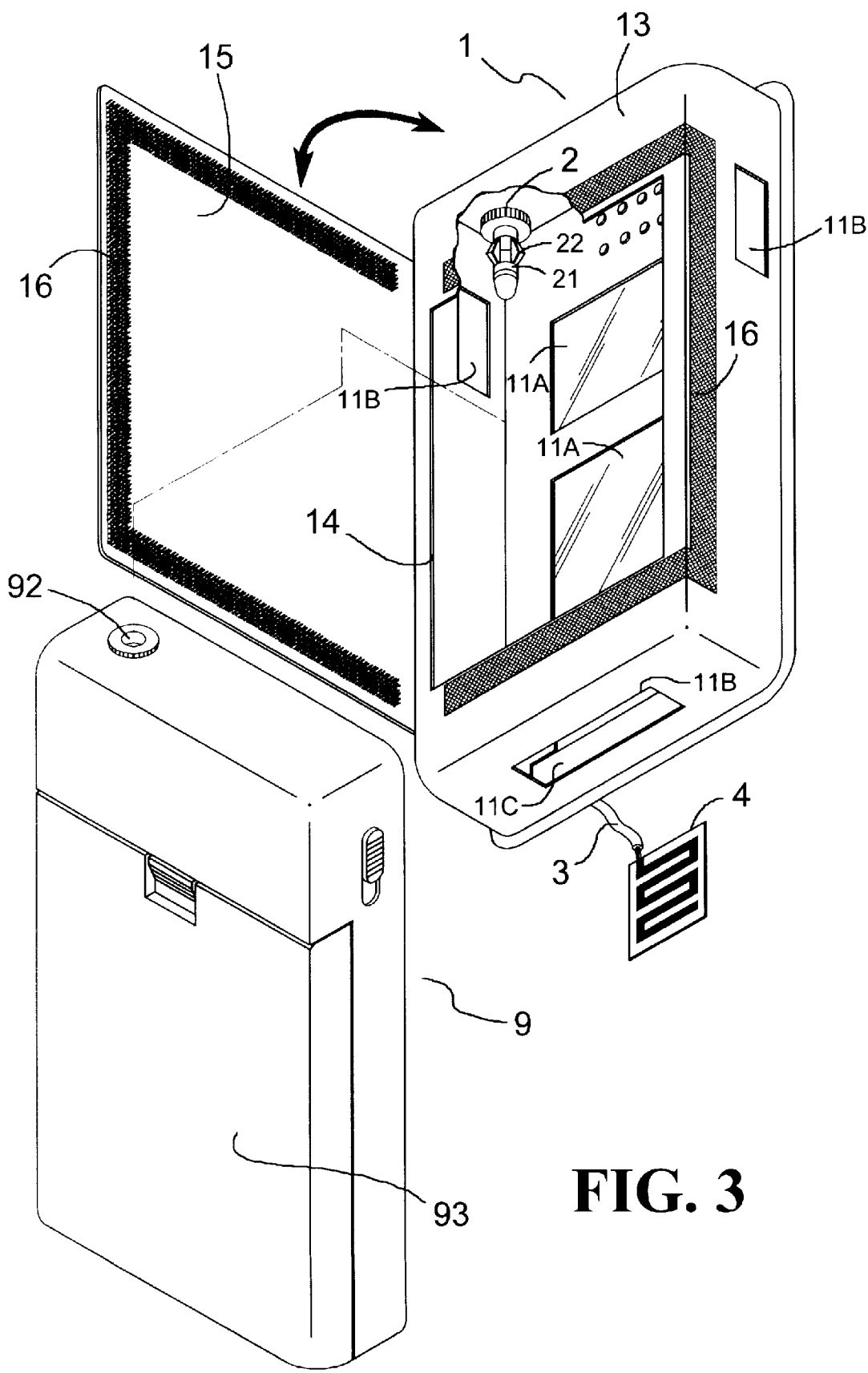
FIG. 3 is an exploded view of the first embodiment.

With reference to FIGS. 1 to 3, the first embodiment about the electromagnetic wave preventing cover of a mobile phone handset of the present invention is illustrated. In this embodiment, the electromagnetic wave preventing cover is matched with a set of mobile phone handset 9 with an openable and foldable covering plate 91. The cover 1 is made by cutting or seaming a soft skin or artificial leather. The cover may completely enclose the mobile phone handset 9. The front surface 1 and peripheral lateral sides of the cover 1 are installed with a plurality of windows 11A of transparent thin films and hollow holes 11B. Especially, a slot 11C for extending the communicating covering plate 91 is installed below the front surface 12 of the cover. Moreover, an opening 14 is installed at the rear surface 13 of the cover for receiving the handset 9. The inner periphery of a shielding cover and the outer periphery of the rear opening of the cover are installed with respective buckles 16, for example, buckling nails or sticking straps. A shielding piece 15 is installed at the outer side of the opening. Therefore, the shielding piece 15 can be openable and foldable freely at the opening 14 on the rear surface of the cover.

With reference to FIG. 3, a terminal 2 is installed within the cover 1 with respect to the position of the antenna seat hole 92 of the handset. The pillar 21 in front of the terminal has an expandable elastic structure 22. Therefore, the terminal 2 can be firmly inserted into the antenna seat hole 92 on the handset. A micro-wave shield coaxial cable 3 is installed within the cover 1 and the front end thereof is connected the terminal 2. A part of the distal end of the cable extends out of the cover 1 and is connected to a planar antenna 4. Besides, the inner surface of the planar antenna 4 is coated with gluing material and the outer surface thereof is coated with a beautiful decorating pattern.

As the handset is assembled with the cover, the mobile phone handset 9 passes through the opening 14 of the rear surface of the cover so that the terminal 2 inserts into the antenna seat hole 92 of the handset. Furthermore, the communicating covering plate 91 of the handset passes through the slot 11C of the cover to extend out of the front surface 12 of the cover. Then, by the shielding piece 15 to be buckled to the periphery 14 of the rear surface of the cover, the handset 9 is enclosed within the cover 1 firmly. Finally, the planar antenna 4 is adhered to the outer surface 91A of the communicating covering plate of the handset. Therefore, the assembly work is completed. In the practical application of the present invention, when the handset is in communication, the planar antenna 4 for receiving electromagnetic radiation will increase a distance of at least ten centimeters to the central position of the brain due to the communicating covering plate 91 is opened. In communication, the present invention reduces the electromagnetic radiation with a ratio of at least 100 times than the prior art antenna of a handset adhering to the ear of a user. Moreover, as the communicating covering plate 91 is opened, the planar antenna 4 will expose at outer side of the user so that the planar antenna will not be interrupted. With comparing to the prior art antenna of a handset, since in using, it is shielded by the head of a user, the receiving and transmitting of electromagnetic wave signal is more efficient. Moreover, when the battery 93 of a handset is desired to be updated, the user is only necessary to open the shielding piece 15 to update the battery from the opening 14 of the rear surface of the cover. It is unnecessary to pull out the whole handset completely. This, the updating operation is very simple.

Figure 4:
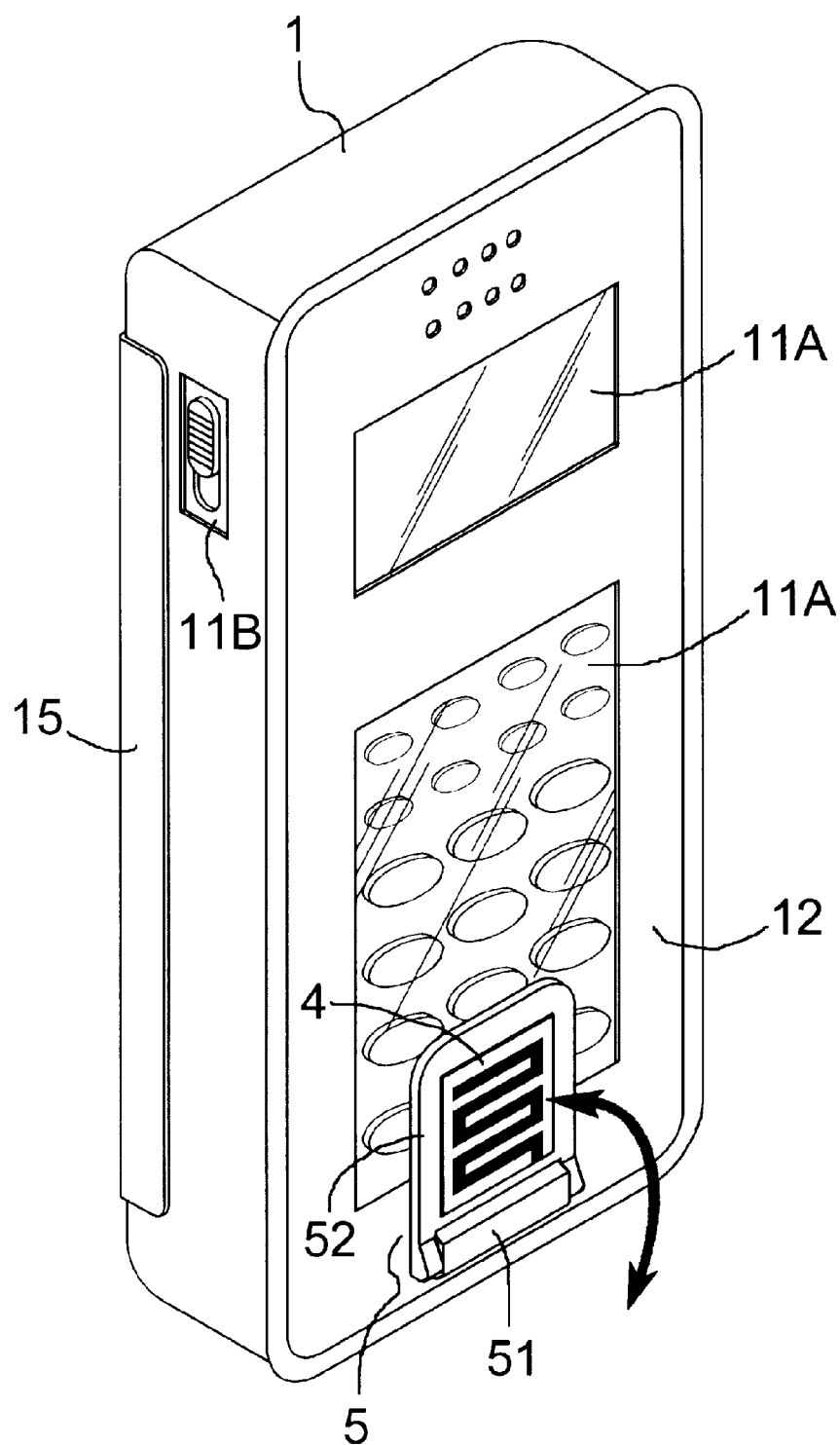
FIG. 4 is a front perspective view of the second embodiment according to the present invention.

The second embodiment of the present invention is illustrated in FIG. 4. The difference of this embodiment from the first embodiment is that the electromagnetic wave preventing cover is matched with a mobile phone handset with an unopenable communicating covering plate. In this embodiment, the cover 1 is made by cutting or seaming a soft skin or artificial leather. The cover may completely enclose the mobile phone handset 9. The front surface 1 and peripheral lateral sides of the cover 1 are installed with a plurality of windows 11A of transparent thin films and hollow holes 11B suitable for the operating panel or function switches. Moreover, an opening 14 is installed at the rear surface 13 of the cover for receiving the handset 9. A shielding piece 15 is installed at outer side of the opening. The inner periphery of a shielding cover and the outer periphery of the rear opening of the cover are installed with respective buckles 16, for example, buckling nails or sticking straps. Therefore, the shielding piece 15 can be openable and foldable freely at the opening 14 on the rear surface of the cover. A terminal 2 is installed within the cover 1 with respect to the position of the antenna seat hole 92 of the handset. The pillar 21 in front of the terminal has an expandable elastic structure 22. Therefore, the terminal 2 can be firmly inserted into the antenna seat hole 92 on the handset. A micro-wave shield coaxial cable 3 is installed within the cover 1 and the front end thereof is connected to the terminal 2. While another end is connected to an openable antenna seat 5. The seat 51 of the openable antenna seat is firmly secured to lower portion of the front surface 12 of the cover. A free openable and foldable covering plate 52 is combined with the seat 51. A planar antenna 4 is installed at the outer surface of the covering plate. Moreover, the planar antenna is communicated with the aforesaid microwave shield coaxial cable 3.

When the handset is assembled with the cover, at first, the mobile phone handset 9 passes through the opening 14 at the rear surface of the cover so that the terminal 2 inserts into the antenna seat hole 92 of the handset. By the shielding piece 15 to buckle to the periphery around the opening 14 at the rear surface of the cover, the handset 9 is enclosed within the cover 1. Therefore, the assembly work is completed. When the handset is in communication, the covering plate 52 of the openable antenna seat will be opened outwards so that the planar antenna 4 on the covering plate exposes to the outer side of the user. Therefore, the planar antenna is avoided to be interrupted by human body and thus the receiving and transmission efficiency of the electromagnetic wave signal is increased. Moreover, as the efficiency of the application in the embodiment, in the present embodiment, the receiving and transmitting source of the handset is far away from the user's brain, and therefore, the harm of the electromagnetic radiation to the brain is reduced effectively. Furthermore, by the opening at rear surface of the cover to match with the free opanable shielding piece, the battery of the handset can be updated easily.

Figure 5:
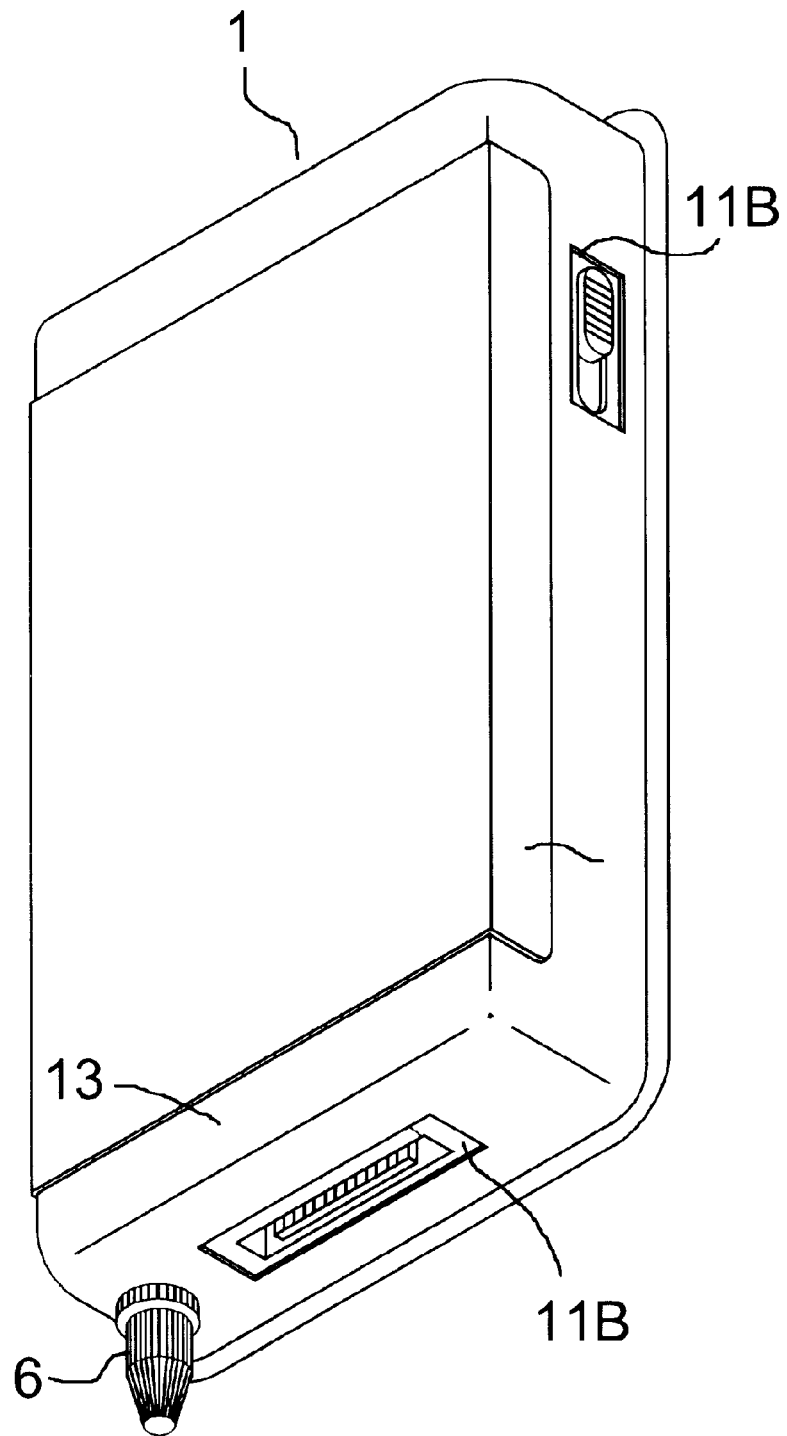
FIG. 5 is a front perspective view of the third embodiment according to the present invention.

The present invention does not be confined by the aforesaid embodiments. Apparently, those skilled in the art may modify the aforesaid embodiment with referring to the aforesaid description. For example, in the second embodiment, the openable antenna seat 5 is replaced by a cylindrical antenna 6. The cylindrical antenna 6 is installed at the lower lateral side of the cover 1 (as shown in FIG. 5). Similarly, in this modified embodiment, the shielding effect of the handset to the user's brain is achieved, and thus the receiving and transmitted efficiency is achieved. Therefore, although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A electromagnetic wave preventing cover of an mobile phone handset being covered by a casing with a free openable and foldable communicating covering plate and being connected to an antenna seat hole of the handset, so that a transmitting antenna of the mobile phone handset for emitting electromagnetic radiation is far away from the brain of an user, and thus, the harm of the electromagnetic wave to the brain is reduced; the electromagnetic wave preventing cover comprising:

- a cover having a space for enclosing the mobile phone handset, and having a slot at the front surface of the cover for extending the communicating covering plate of the handset, and the cover having an opening for receiving the handset into the cover;
- a terminal being installed within the cover for inserting into the antenna seat hole of the mobile phone handset;
- a planar antenna adhered to the outer surface of the communicating covering plate of the handset; and
- a micro-wave shield coaxial cable fixed within the cover and having an end connected to the terminal and another end connected to the planar antenna.

2. The electromagnetic wave preventing cover of a mobile phone handset as claimed in claim 1, wherein at the rear surface of the cover has an opening for receiving the handset to enter into the cover; a shielding piece is installed at the outer side of the opening, the inner periphery of a shielding cover and the outer periphery of the rear opening of the cover are installed with respective buckles, so that the shielding piece can be opened freely at the opening on the rear surface of the cover.

3. The electromagnetic wave preventing cover of a mobile phone handset as claimed in claim 1, wherein the pillar at the front end of the terminal is installed with a telescopic elastic piece.

4. The electromagnetic wave preventing cover of a mobile phone handset as claimed in claim 1, wherein the planar antenna is coated with a beautiful decorating pattern.

5. An electromagnetic wave preventing cover of an mobile phone handset being covered in a casing and being connected to an antenna seat hole of the handset, so that a transmitting antenna of the mobile phone handset is far away from the brain of an user in communication, and thus, the harm of the electromagnetic wave to the brain is reduced; the electromagnetic wave preventing cover comprising:

- a cover having a space for enclosing the mobile phone handset, and having an opening at the cover for receiving the handset into the cover;
- a terminal being installed within the cover for inserting into the antenna seat hole of the mobile phone handset;
- an openable antenna seat having a seat firmly secured to the lower portion at the front surface of the cover, an free openable and foldable covering plate is combined to the seat, and a planar antenna at the outward surface of the covering plate;
- a micro-wave shield coaxial cable fixed within the cover and an end thereof being connected to the terminal, while another end being connected to a planar antenna.

6. An electromagnetic wave preventing cover of an mobile phone handset being to a casing and being connected to an antenna seat hole of the handset, so that a transmitting antenna of the mobile phone handset is far away from the brain of an user in communication, and thus, the harm of the electromagnetic wave to the brain is reduced; the electromagnetic wave preventing cover comprising:

- a cover having a space for enclosing the mobile phone handset, and having an opening at the cover for receiving the handset into the cover;
- a terminal being installed within the cover for inserting into the antenna seat hole of the mobile phone handset;
- a cylindrical antenna firmly secured the lower lateral side of the cover; and
- a micro-wave shield coaxial cable fixed within the cover and an end thereof being connected to the terminal, while another end being connected to a planar antenna.

* * * * *